United States Patent
Jackson

(10) Patent No.: US 6,990,045 B2
(45) Date of Patent: Jan. 24, 2006

(54) METHODS FOR ACQUIRING SEISMIC DATA WHILE TRIPPING

(75) Inventor: James C. Jackson, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 445 days.

(21) Appl. No.: 10/108,402

(22) Filed: Mar. 28, 2002

(65) Prior Publication Data

US 2003/0185099 A1 Oct. 2, 2003

(51) Int. Cl.
*H04H 9/00* (2006.01)
*G01V 1/00* (2006.01)
*E21B 47/00* (2006.01)

(52) U.S. Cl. .............. 367/81; 367/25; 367/57; 166/250.01; 175/50

(58) Field of Classification Search ............... 367/57, 367/56, 81, 82, 83, 84, 85; 175/50; 166/249, 166/250.01, 251.1, 252.1
See application file for complete search history.

(56) References Cited

U.S. PATENT DOCUMENTS

| | | |
|---|---|---|
| 3,185,997 A | 5/1965 | Carlton et al. |
| 3,260,112 A | 7/1966 | Godbey et al. |
| 3,710,448 A | 1/1973 | Kimmel et al. |
| 4,298,967 A | 11/1981 | Hawkins |
| 4,320,473 A * | 3/1982 | Smither et al. ............... 367/82 |
| 4,563,757 A | 1/1986 | Decorps et al. |
| 5,555,220 A | 9/1996 | Minto |
| 5,585,556 A | 12/1996 | Petersen et al. |
| 5,589,825 A | 12/1996 | Pomerleau |
| 6,131,694 A * | 10/2000 | Robbins et al. ............. 181/105 |
| 6,378,627 B1 * | 4/2002 | Tubel et al. .................. 175/24 |
| 6,424,595 B1 * | 7/2002 | Chenin ....................... 367/82 |
| 6,614,718 B2 | 9/2003 | Cecconi et al. |
| 6,662,899 B2 * | 12/2003 | Norris et al. ............... 181/102 |

FOREIGN PATENT DOCUMENTS

| | | |
|---|---|---|
| EP | 0 239 464 | 9/1987 |
| EP | 0 939 195 | 9/1999 |

* cited by examiner

*Primary Examiner*—Thomas H. Tarcza
*Assistant Examiner*—Scott A. Hughes
(74) *Attorney, Agent, or Firm*—Madan, Mossman & Sriram, P.C.

(57) ABSTRACT

A method is described for acquiring seismic data while removing, or tripping, a drill string from a wellbore. The method comprises, conveying an autonomous seismic receiver down a fluid passage in the drill string to a predetermined location proximate a lower end of the drill string; generating signals by a seismic source near a surface location; detecting the seismic signals with at least one sensor in the seismic receiver at least one predetermined location of interest in the wellbore as the drill string is removed from the wellbore; and storing the detected seismic signals in the seismic receiver.

11 Claims, 3 Drawing Sheets

METHODS FOR ACQUIRING SEISMIC DATA WHILE TRIPPING

BACKGROUND OF THE INVENTION

1. Field of the Invention

The present invention is related to the field of geophysical exploration and more specifically to a method of using a seismic receiver in a drill string in a wellbore to acquire seismic data while tripping the drill string from the wellbore.

2. Description of the Related Art

In drilling a borehole to recover oil from the earth, it is often helpful to turn or steer the downhole drill bit toward or away from subterranean targets. To facilitate this geophysical steering, drillers need to know drill bit location on the seismic section. The location of targets ahead of the bit is also required, as well as some warning or indication of drilling hazards such as over-pressured formations or thin, shallow gas intervals. Surface seismic surveys generally include this information, but resolution and depth location is poor because surface seismic surveys are time based (rather than depth based). For example, to determine the depth of a reflection, a speed of sound for the formation must be known. Consequently, these systems require depth calibration to accurately determine locations of target horizons or drilling hazards. Traditionally, this calibration has been provided by either offset well sonic data or wireline checkshot data in the current well. Offset data is often inadequate however due to horizontal variations in stratigraphy between wells.

During surface seismic surveys, a plurality of seismic sources and seismic receivers are placed on the surface of the earth. The seismic sources are triggered in a predetermined sequence, resulting in the generation of seismic waves. These seismic waves travel downward through the earth until reflected off some underground object or change in rock formation. The reflected seismic waves then travel upward and are detected at the seismic receivers on the surface. One or more clocks at the surface measure the time from generation of the seismic waves at each source to the reception of the seismic waves at each receiver. This gives an indication of the depth of the detected object underground. However, the exact speed of sound for these seismic waves is unknown, and thus, the exact depth of the detected object is also unknown. To more closely measure the exact speed of sound, a "wireline checkshot" may be used to calibrate depth measurements. During a "wireline checkshot," a receiver on a "wireline" is lowered a known distance into an already-drilled borehole. A surface seismic source is then triggered and the time is measured for the seismic wave to travel to the wireline receiver. Because the depth of the wireline receiver is known, an average interval velocity indicating the average speed of the seismic wave can be determined with some degree of accuracy. Wireline checkshots, however, require removing the bit out of the hole, commonly known as tripping, and are often prohibitively expensive.

The methods of the present invention overcome the foregoing disadvantages of the prior art by providing a technique for deploying an autonomous wellbore seismic receiver in a drill string without the use of a wireline and acquiring seismic data as the drill string is removed from the wellbore.

SUMMARY OF THE INVENTION

The present invention contemplates a method for acquiring seismic data while tripping a drill string from a wellbore.

In one preferred embodiment, a method is described for acquiring seismic data while removing a drill string from a wellbore, comprising;
- conveying an autonomous seismic receiver down a fluid passage in the drill string to a predetermined location proximate a lower end of the drill string;
- generating signals by a seismic source near a surface location;
- detecting the seismic signals with at least one sensor in the seismic receiver at at least one predetermined location of interest in the wellbore as the drill string is removed from the wellbore; and
- storing the detected seismic signals in the seismic receiver.

In another preferred embodiment, a method is described for acquiring seismic data while removing a drill string from a wellbore, comprising;
- synchronizing, at the surface, a surface clock in a surface controller with a downhole clock in an autonomous seismic receiver;
- programming, at the surface, a processor in the autonomous seismic receiver to activate during at least one predetermined time window after a predetermined delay time,
- conveying an autonomous seismic receiver down a fluid passage in the drill string to a predetermined location proximate a lower end of the drill string;
- generating, under control of a surface processor, signals by a seismic source near a surface location;
- detecting the generated seismic source signals with a near-source sensor and storing said signals in the surface processor;
- detecting the seismic signals with at least one sensor in the seismic receiver at at least one predetermined location of interest in the wellbore as the drill string is removed from the wellbore;
- storing the detected seismic signals in the seismic receiver;
- transferring, at the surface, the detected seismic signals from the seismic receiver to the surface processor; and
- processing the near-source signals and the seismic receiver detected signals according to programmed instructions to generate a seismic map.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DESCRIPTION OF PREFERRED EMBODIMENTS

Figure 1:
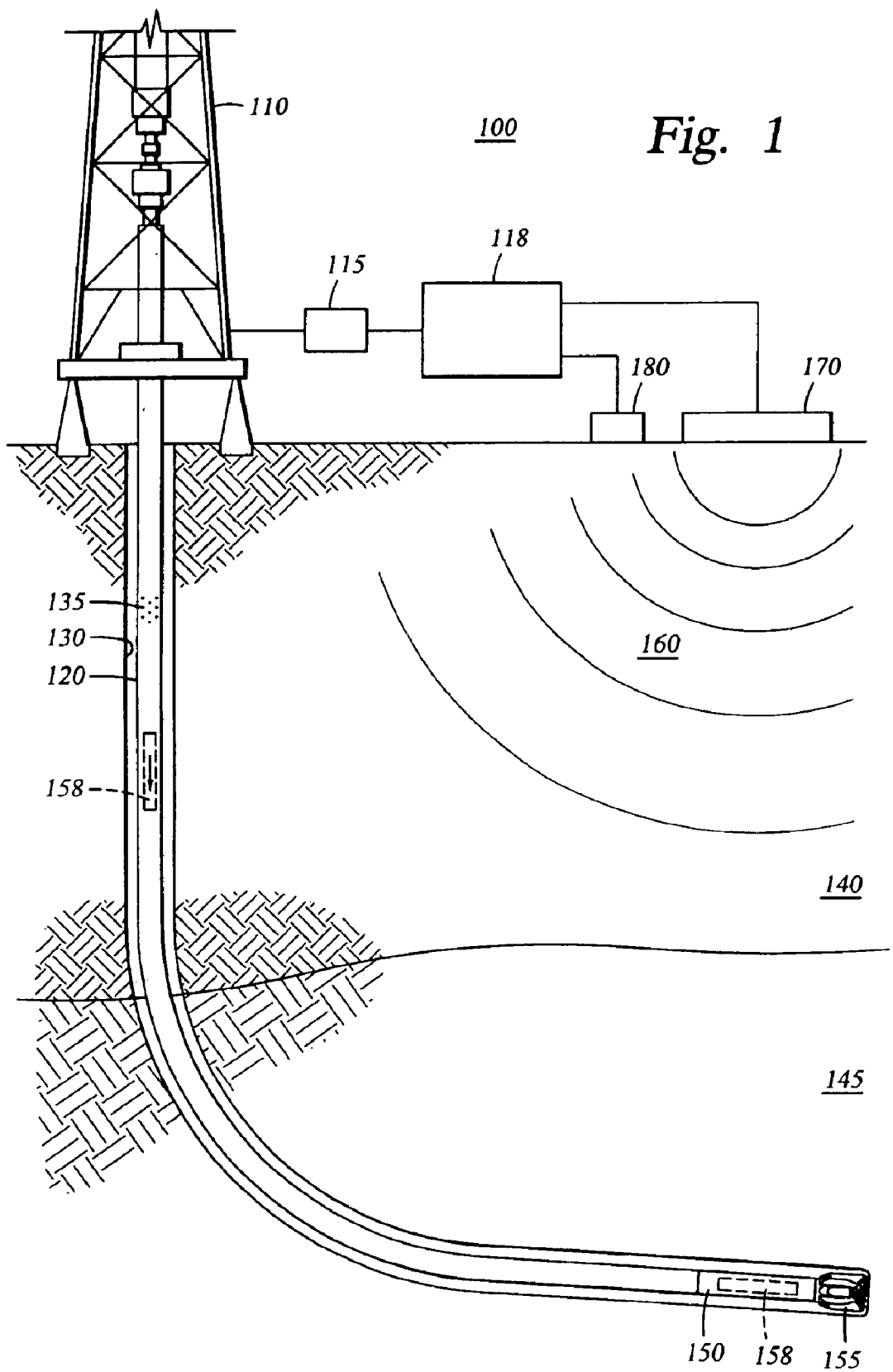
FIG. 1 is a schematic diagram of a seismic acquisition system for use in one embodiment of the present invention.

Referring to FIG. 1, a system 100 according to the present invention includes a derrick 110 with an attached drillstring 120. A drill bit 155 creates a well bore 130 through the surrounding formation 140, which may also include formation boundaries corresponding to, for example, an overpressurized zone 145. A seismic receiver 158 with appropriate seismic sensors is inserted into the drillstring 120 and falls by gravity to a landing sub 150 near the drill bit 155. Alternatively, the seismic receiver 158 may be deployed using the drilling fluid 135 to effectively pump the receiver 158 to the landing sub 150. The seismic receiver 158 receives seismic signals 160 from a seismic source 170, such as a mechanical vibrator, located at the surface. The use of a mechanical vibrator is exemplary only, as the system may be either land or marine-based, and is not seismic source-type specific. For example, an offshore system may include an air gun array, either hung from an offshore platform or located near a service boat or anchored buoy. The seismic source 170 thus provides a suitable vertical seismic profiling quality source signal. Also located at the surface is a depth indicator 115 to measure the depth of the drillstring 120. The depth indicator signals are transmitted to a surface controller 118 where they are time stamped and stored in memory. The surface controller 118 is connected to the seismic source 170 for controlling the generation of seismic signals. The actual connection between the controller 118 and the seismic source 170 can be a hardwire, radio telemetry or any other suitable communication system. Surface controller 118 contains circuitry, processing capability, and memory storage, and functions according to programmed instructions to control the generation of seismic signals. The surface controller circuitry contains a real-time clock for time coding the transmitted source signal. A near-field sensor 180 is located near the source 170 and is used to record the acoustic signature of the source 170. The output of sensor 180 is transmitted to the surface controller 118 where it is time stamped and stored in memory. The memory used for storing data in the surface processor may be internal random access memory, magnetic storage, optical storage, or any combination of these.

Figure 2:
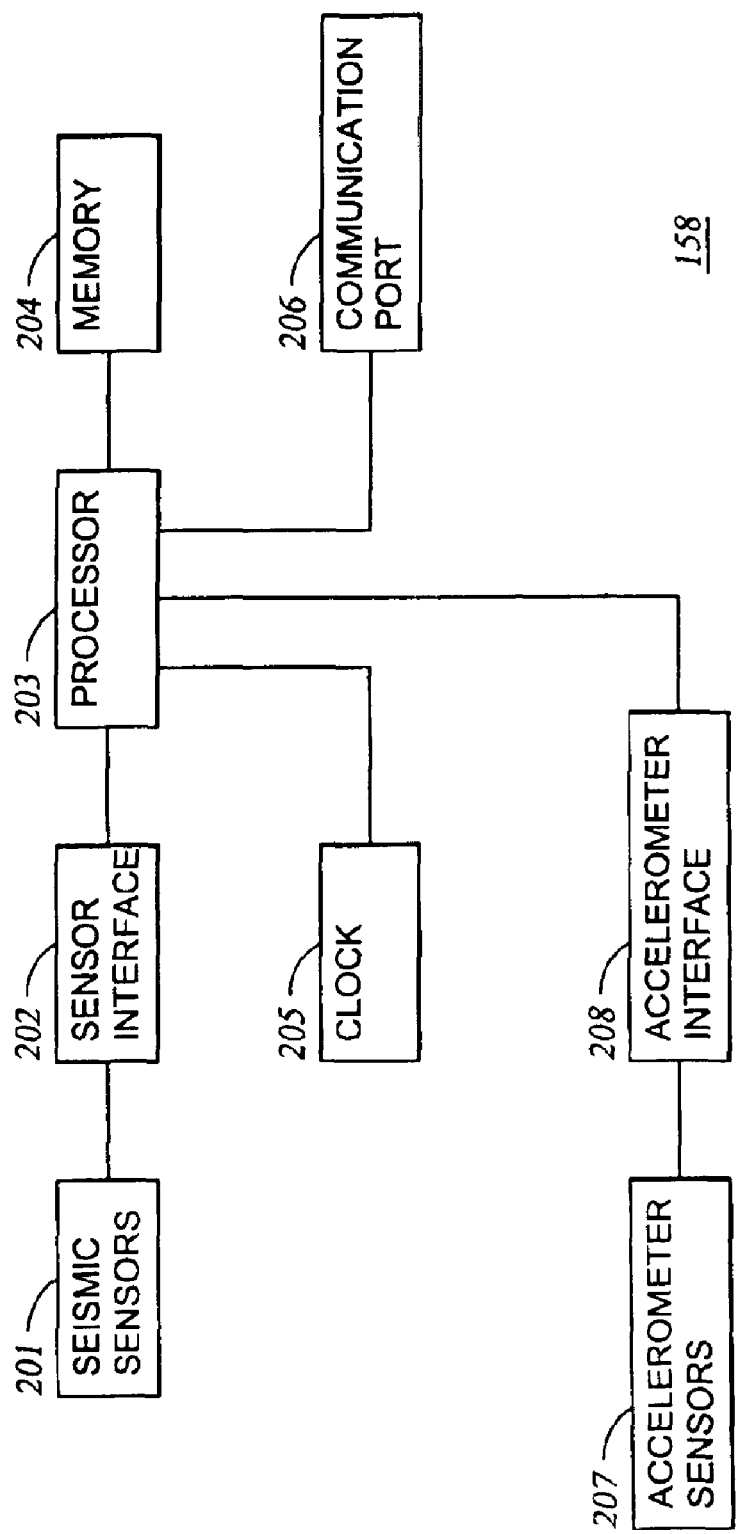
FIG. 2 is a block diagram of a seismic receiver for use in one embodiment of the present invention.

Referring to FIG. 2, the seismic receiver 158 may include a combination of sensors 201 such as hydrophones and geophones along with suitable sensor interface circuitry 202, a processor 203, and memory 204 for storage of programmed instructions and storage of received seismic data. A real time clock circuit 205 is also included in the receiver 158 to provide time stamps for the received seismic signals. The surface located real-time clock and the receiver located real-time clock 205 are synchronized at the surface before deploying the seismic receiver 158 into the wellbore 130. A communications port 206 is included to download program instructions to memory 204 and to upload stored seismic data to a surface system such as surface processor 118. The receiver 158 is powered by batteries (not shown). A similar slick-line deployable receiver is described in U.S. Pat. No. 5,555,220 to Minto, assigned to the assignee of this application and incorporated herein by reference. Sub 150 is adapted to physically latch to the landed receiver 158 to substantially prevent the receiver 158 from bouncing as the drill string 120 is tripped from the wellbore 130.

Figure 3:
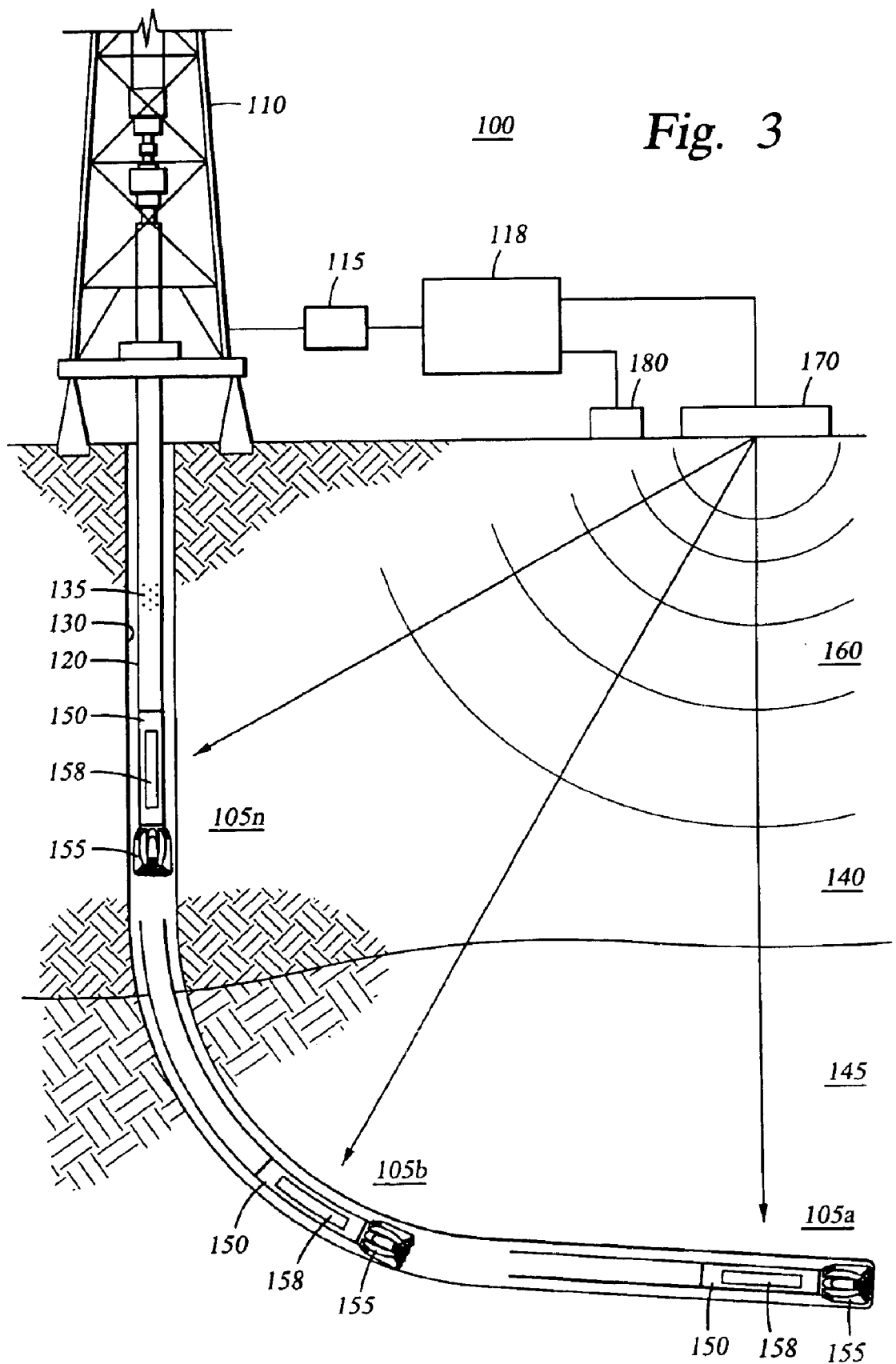
FIG. 3 is a schematic of a seismic acquisition system for use in one embodiment of the present invention.

In operation, shown in FIG. 3, the seismic receiver has been conveyed to the bottom of the drill string 120 and is latched into the landing sub 150 prior to tripping the drill string 120 out of the wellbore 130 and is located at position 105a. The seismic receiver is programmed at the surface to turn on the seismic receiving sensors 201 after a predetermined time delay. The time delay is operator selected to allow the receiver 158 to reach the landing sub 150 before activating the seismic sensors 201. After the programmed time delay, the surface processor 118 is initiated to begin to cycle the surface source 170 generating seismic signals 160 at predetermined intervals. The interval between signals is selected, depending on receiver depth, in order to prevent overlap of successive signals.

In one preferred embodiment, the receiver 158 is programmed to take samples during predetermined time windows selected by the operator. The surface processor is programmed to transmit during these predetermined time windows. The predetermined time windows are selected to approximately correlate with the normal tripping speed so that the sampling time windows will occur at desired sample locations in the wellbore. The operator stops motion of the drill string during these windows to provide a relatively low noise environment for the seismic sensors 201. The receiver processor 203 samples, time stamps, and stores the detected signals during the predetermined window in memory 204. After the initial on-bottom detection, the drill string 120 tripping process begins. The tripping is stopped at the predetermined locations in the wellbore 130 such as location 105b, 105n and the drill string 120 is held stationary during the time sample windows. While three locations of interest are shown in FIG. 3, any number of locations of interest may be chosen. The surface processor 118 cycles the source 170 during each sample window. The near-field sensor 180 detects each generated source signal and transmits the detected signal to the surface processor 118 where it is time stamped and stored in memory in the surface processor 118. At the end of the tripping process, the seismic receiver 158 is retrieved from the landing sub 150. The time-stamped seismic signals are transmitted via the communications port 206 to the surface processor where they are processed with the near-field signals and the depth data, according to techniques known in the art, to provide an improved seismic map of the downhole formation.

In another preferred embodiment, the receiver 158 has at least one accelerometer 207 mounted in the receiver 158 to sense movement of the drill string 120, see FIG. 2. Signals from accelerometer 207 are conditioned by interface circuits 208 and fed to processor 203. Accelerometer 207 is powered continuously from the time the seismic receiver 158 is inserted into the wellbore until the receiver is returned to the surface after the seismic data acquisition process. These accelerometer signals are used to switch the seismic receiving cycle on and off in receiver 158. When the drill string 120 is positioned at a location where it is desirable to take seismic data, such as 105a, 105b, and 105n in FIG. 3, the drill string 120 is held stationary at the surface. The accelerometer generated signals are used by the processor 203 to determine that the drill-string 120 has stopped moving and initiates the taking of seismic data. The processor is preprogrammed to receive and store data for a predetermined period of time sufficient to receive several source signals. The source 170 is activated as described above and data is taken and stored from the near-field sensor 180 and the depth sensor 115 as described previously. As before, the downhole received and stored data is transferred to the surface processor 118 when the seismic receiver 158 is returned to the surface.

In yet another preferred embodiment, an acoustic source (not shown) is coupled to the drill-string at the surface when the drill-string 120 is stopped to take seismic data. The acoustic source transmits a coded signal through the drill-string 120 that is detected and decoded by the seismic receiver 158. The coded signal can be used to initiate the taking of data by the receiver 158. Such acoustic systems are known in the art and are not discussed here further.

Therefore, one preferred method of acquiring seismic data while tripping includes at least the steps of;

programming the seismic receiver at the surface to turn on after a predetermined time interval, to stay on and acquire data for a predetermined time, and to activate the acquisition process at predetermined times where the predetermined times correlate to locations of interest for taking seismic data while tripping out of the wellbore;

synchronizing a surface clock in the surface processor with a downhole clock in the seismic receiver;

conveying the autonomous seismic receiver to a landing sub located near the drill bit;

generating seismic signals under control of the surface processor at the predetermined times correlating with the locations of interest of the seismic receiver as it is tripped out of the wellbore;

detecting the generated seismic signals by a near-source sensor and storing the detected signals correlated with real time and drill-string depth in the surface processor;

receiving and storing the generated seismic signals correlated with real time in the downhole seismic receiver at the locations of interest as the receiver is tripped out of the hole;

transferring the seismic receiver data to the surface processor when the receiver is removed from the wellbore; and generating updated seismic maps of the formations surrounding the wellbore.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method for acquiring seismic data while removing a drill sting from a wellbore, comprising;

conveying an autonomous seismic receiver down a fluid passage in the drill string to a predetermined position proximate a lower end of the drill string;

generating a signal by a seismic source near a surface location;

holding the drill string substantially motionless while detecting the seismic signal with a sensor in the seismic receiver at a predetermined location of interest in the wellbore as the drill string is removed from the wellbore; and storing the detected seismic signals in the seismic receiver.

2. The method of claim 1 further comprising landing said seismic receiver in a landing sub located in the drill string proximate a lower end of the drill string.

3. The method of claim 2 further comprising firmly latching the seismic receiver in the landing sub.

4. The method of claim 1 further comprising;

detecting the seismic signal with a sensor located at the surface; and storing the signal detected by the surface sensor in a surface processor.

5. The method of claim 1 further comprising downloading the signal stored in the seismic receiver to the surface processor upon removal of the drill string from the wellbore.

6. The method of claim 1 further comprising processing, according to programmed instructions, the surface detected signal and the seismic receiver detected signal to generate a seismic map.

7. The method of claim 1 wherein conveying the autonomous seismic receiver down the passage in the drill string comprises one of (i) allowing the autonomous seismic receiver to fall in an untethered manner by gravity to the lower end of the drill string, and (ii) pumping the autonomous seismic receiver down the wellbore.

8. A method for acquiring seismic data while removing a drill string from a wellbore, comprising;

synchronizing, at the surface, a surface clock in a surface controller with a downhole clock in an autonomous seismic receiver;

programming, at the surface, a processor in the autonomous seismic receiver to activate during a predetermined time window after a predetermined delay time, conveying an autonomous seismic receiver down a fluid passage in the drill string to a predetermined position proximate a lower end of the drill string;

generating, under control of a surface processor, a signal by a seismic source near a surface location;

detecting the generated seismic source signal with a near-source sensor and storing said signal in the surface processor;

holding the drill string substantially motionless during the predetermined time window while detecting the seismic signal with a sensor in the seismic receiver as the drill string is removed from the wellbore;

storing the detected seismic signal in the seismic receiver;

transferring, at the surface, the detected seismic signal from the seismic receiver to the surface processor; and processing the near-source signal and the seismic receiver detected signal according to programmed instructions to generate a seismic map.

9. The method of claim 8 wherein conveying the autonomous seismic receiver down the passage in the drill string comprises one of (i) allowing the autonomous seismic receiver to fall in an untethered manner by gravity to the lower end of the drill string, and (ii) pumping the autonomous seismic receiver down the wellbore.

10. The method of claim 8 further comprising landing said seismic receiver in a landing sub located in the drill string proximate a lower end of the drill string.

11. The method of claim 10 further comprising firmly latching the seismic receiver in the landing sub.

* * * * *